United States Patent [19]

Jones, Jr.

[11] 4,057,536

[45] Nov. 8, 1977

[54] PROCESS FOR PREPARING WHOLLY AROMATIC POLYAMIDES BY MIXING SOLID PARTICULATE REACTANTS AND POLYMERIZING

[75] Inventor: Rufus S. Jones, Jr., Randolph, N.J.

[73] Assignee: Celanese Corporation, New York, N.Y.

[21] Appl. No.: 648,986

[22] Filed: Jan. 14, 1976

[51] Int. Cl.$^2$ .............................................. C08G 69/32
[52] U.S. Cl. .............................. 260/78 R; 260/47 CZ; 260/63 N; 260/78 UA
[58] Field of Search ............ 260/78 R, 47 CZ, 78 UA

[56] References Cited

U.S. PATENT DOCUMENTS 3,063,966   11/1962   Kwolek et al. .................... 260/78 R

*Primary Examiner*—Harold D. Anderson

[57] ABSTRACT

An improved process is provided for preparing wholly aromatic polyamides from solid monomers; particularly, aromatic diamines and aromatic dicarboxylic acid halides. The solid monomers in particulate form are first mixed in the substantial absence of oxygen and in the absence of a solvent or diluent to prepare a uniform monomer mixture having a desired stoichiometry prior to the initiation of the polymerization reaction. The uniform monomer mixture is thereafter polymerized in the presence of an appropriate solvent as herein defined.

11 Claims, No Drawings

PROCESS FOR PREPARING WHOLLY AROMATIC POLYAMIDES BY MIXING SOLID PARTICULATE REACTANTS AND POLYMERIZING

BACKGROUND OF THE INVENTION

The present application relates to a process for the preparation of wholly aromatic polyamides.

Wholly aromatic polyamides, being among the most important of the synthetic polymers, are prepared by a variety of methods including melt polymerization, solution polymerization, solid state polymerization and the like. Generally, these processes are carried out without substantial concern relating to the mode and rate of introduction of monomers to the reaction vessel employed since the polymerization reaction is such that low molecular product is maintained in a state where it can undergo further reaction to form the desired higher molecular weight product. In the solution polymerization of aromatic diamines and aromatic diacid halides, however, the rate of reaction approaches or exceeds the rate of mixing of the monomers. Additionally, in the reaction of certain of these diamines and diacid halides, the viscosity of the reaction mix increases rapidly and a non-flowing gel is formed. Thus, in the solution polymerization, if dissolution and complete mixing of the diamines and diacid halides does not take place within a very short period of time, proper stoichiometry is not achieved and the resulting polyamide product has a lower than desired molecular weight.

Another problem encountered in the solution polymerization employing the diacid halide monomer is the interaction of the diacid halide with the solvent. In many instances, the solvent that gives the optimum polymer molecular weight is reactive toward the diacid halide and solutions of satisfactory purity and reactivity can not be prepared or held for a reasonable length of time.

Typically, the solution polymerization of aromatic diamines and aromatic dicarboxylic acid halides is carried out by bringing together separate solutions of these two monomers or by combining a solution of one of the monomers with the solid, pure, form of the other monomer. The combining of separate solutions of the monomers does not give satisfactory results, particularly on a large scale, because suitable mixing of the reactants before the reaction mixture becomes highly viscous or gel-like may not be possible because of the rapid rate of polymerization. Frequently, the reaction between the acid halide and polymerization solvent mentioned above excludes this two solution technique. The combining of a solution of one type of monomer with the solid form of the second type of monomer is not feasible on a continuous basis because the continuous feeding of the reactants to a reactor in a manner so as to maintain a stoichiometrically balanced system producing high molecular weight polymer is technically difficult. Methods of reacting aromatic diamines and aromatic diacid halides typical of the methods employed heretofore are described in U.S. Pat No. 3,063,966 to Kwolek et al.

It is an object of the present invention, therefore, to provide an improved process for preparing wholly aromatic polyamides that will avoid problems associated with the prior art processes.

It is another object of the present invention to provide an improved solution polymerization process for preparing wholly aromatic polyamides from solid particulate monomers, namely, aromatic diamines and aromatic diacid halides. These and other objects, as well as the scope, nature and utilization of the invention will be apparent to those skilled in the art from the following description and the appended claims.

SUMMARY OF THE INVENTION

According to the present invention, the problems previously associated with the solution polymerization of aromatic diamines and aromatic diacid halides are avoided, or minimized, by a process wherein the monomers in solid particulate form are mixed in the substantial absence of oxygen, $CO_2$ and water and in the absence of a solvent or liquid diluent for the monomers to obtain a uniform solid monomer mixture having a desired stoichiometry, and the uniform solid monomer mixture is thereafter polymerized in the presence of a suitable reaction solvent to obtain the desired wholly aromatic polyamide.

The process according to the present invention enables desired high molecular weight wholly aromatic polyamides to be prepared consistently since the delicate stoichiometric balance required in the polymerization of such products is achieved independently of the subsequent step of polymerization. I.e., by achieving desired stoichiometry prior to reaction of the monomers, product quality is not dependent upon the rate of mixing of the monomers. Moreover, since the monomers do not come into contact with the solvent before initiation of polymerization, solvent attack on the monomers is avoided.

The process according to the present invention is especially suitable for the continuous production of wholly aromatic polyamides since a precise metering of reactants to maintain a delicate stoichiometry is not required - only the less sensitive maintenance of a requisite "solids" level is required.

DESCRIPTION OF THE PREFERRED EMBODIMENTS

Aromatic diamines suitable for use in the process according to the present invention are those corresponding to the formula $H_2N—Ar—NH_2$ wherein Ar is a divalent aromatic radical which is meta or para oriented and which is selected from the group consisting of

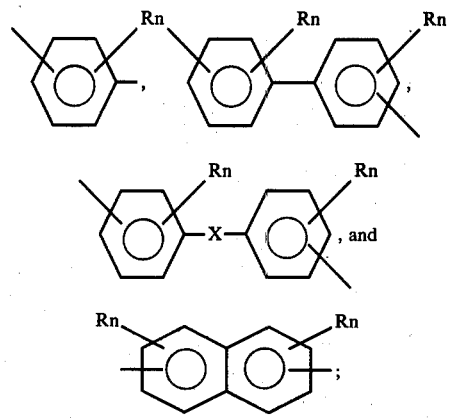

wherein R is alkyl or alkoxy of 1 to 6 carbons, chlorine, bromine or phenyl; $n$ is an integer of 0 to 4; and X is —O—, —S—,

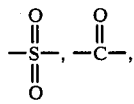

alkenylene of 2 to 6 carbons (—CH=CH—, —CH=CHCH$_2$—, and the like), cycloalkylidene of up to 8 carbons, azo (—N=N—), azoxy

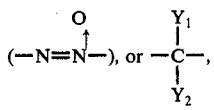

wherein $Y_1$ and $Y_2$ are independently hydrogen, alkyl of 1 to 6 carbons, phenyl or phenyl substituted with up to five substituents as defined for R above.

The aromatic diamines useful in the process of the invention are solids at room temperature. As representative diamines there may be mentioned meta- and para-phenylenediamine, methyl meta- and para-phenylenediamine, methoxy meta- and para-phenylenediamine and chloro-meta- and para-phenylenediamine. A single aromatic diamine may be reacted with a single aromatic diacid halide in the process of the invention or two or more aromatic diamines may be reacted with two or more aromatic diacids. Meta-phenylenediamine and para-phenylenediamine are particularly preferred as the aromatic diamines.

Aromatic diacid halides useful in the present invention are those corresponding to the formula:

wherein Hal is chlorine or bromine and Ar is a divalent aromatic radical as defined above for the diamine. The diacid chloride is preferred; terephthaloyl dichloride and isophthaloyl dichloride being particularly preferred. Nonlimiting examples of other diacid halides suitable for use in the present invention are 4,4'-biphenyl dicarboxylic acid dichloride; 1,5-naphthalene dicarboxylic acid dichloride; and 4,4'-azoxy benzene dicarboxylic acid dichloride.

The aromatic daimines and aromatic diacid halides are generally employed in the solids mixture in substantially equimolar proportions. When three or more monomers are used to form terpolymers and the like the mole ratios employed will depend upon the polymer properties desired. These ratios are well known to those skilled in the art.

The mixing of the solid particulate monomers is carried out in the absence of oxygen and in the absence of carbon dioxide and water. Solvents and liquid diluents are also excluded from the monomer mixing zone to prevent undesirable reaction of the monomers. Minor amounts of oxygen of below about 0.5% volume and, preferably, below 0.1% by volume may be tolerated in the mixing zone. Preferably, the mixing is carried out under a blanket of inert gas, such as nitrogen, neon, argon, krypton and the like. The blanket of inert gas is desired to prevent the formation via oxidation and hydrolysis of undesirable products during the mixing step.

The mixing is carried out in any type of particulate solids mixing zone or apparatus either on a batch or a continuous basis, although batch mixing is preferred and is most conveniently employed.

The mixing is carried out so as to maintain the temperature of the monomers below their melting point. Melting of the monomers is undesirable, of course, to prevent a premature reaction. It is to be noted that cooling may be required during mixing of certain monomers where the melting point of a monomer is sufficiently low such that heat generated by the friction of mixing may cause the monomer to melt.

The mixing of the solid monomers is conveniently carried out under atmospheric pressure. Super and subatmospheric pressures, however, can be utilized if desired.

The solid monomers are utilized in particulate form. Particle size is not critical to the mixing step but is determined by the conditions selected for the subsequent solution polymerization step. The particle size of the monomers may be that employed in the solution polymerization of aromatic diamines and aromatic diacid halides as presently practiced in the art. Particles of solid monomers which will pass through a 24 mesh screen of the Tyler series have been found to have utility in the process of the invention.

The time of mixing of the solid monomers is not believed to be critical so long as the mixing is sufficient to produce a uniform monomer mixture.

The uniform solid monomer mixture may be employed immediately in the subsequent solution polymerization step or may be stored under conditions which prevent oxidation and hydrolysis of the reactant monomers and premature reaction between the monomers.

The solution polymerization step may be carried out in any conventional type solution polymerization apparatus and under any of the conditions conventionally employed in the solution polymerization of aromatic diamines and aromatic diacid halides. These polymerization conditions and techniques are well known to those skilled in the art and form no part of the present invention.

The solution polymerization step may be carried out in a batch or in a continuous process. If a batch process is employed, the uniform mixture of monomer solids is preferably rapidly added to the solvent to be employed while the solvent is undergoing agitation. Best results are obtained when rapid agitation is employed although the precise degree of agitation is not critical if it is sufficient to produce a uniform reaction mixture. The rate of agitation required is dependent upon the monomers chosen, and the other conditions used in the polymerization including solvent, temperature, solids lever, etc. In general, when reaction conditions favor a faster reaction rate, faster stirring is desirable and rapid addition of all of the monomer mixture is more critical.

The solution polymerization step may also be carried out in a continuous process by simultaneously mixing the solids mixture with the reaction solvent in a suitable continuous mixing zone. For example; a mixing chamber or injector mixer may be employed.

The solids mixture and solvent are fed to the reaction zone such that the percent solids does not exceed about 30 weight percent based on the combined weight of the solids and the solvent. Any practical lower solids concentration, however, may be used. A solid level of about 10-15% is best for the polymerization to produce paraphenylene terephthalamide polymer.

The solution polymerization step is usually carried out at room temperature although temperatures approaching the freezing point of the reaction mixture may be employed to slow the reaction. Temperatures as high as 100° C. may also be employed and are sometimes desirable. Preferably, the temperature is carried out at a temperature of below about 50° C.

Amide-type solvents are preferred as the reaction solvent since these solvents also function as acid acceptors and heat transfer agents and in many cases are excellent polyamide solvents yielding solutions having high solids content.

Suitable amide-type solvents are those corresponding to the formula

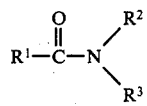

wherein $R^1$ is hydrogen or alkyl of 1 to 4 carbons and $R^2$ and $R^3$ are independently alkyl of 1 to 4 carbons. Examples of solvents corresponding to the above formula include N, N-dimethylformamide; N, N-dimethylacetamide; N,N-dimethylpropionamide; N, N-dimethylbutyramide; N, N-dimethylisobutyramide; N, N-diethylacetamide and the like. Other amide-type solvents such as tetramethylurea, tetraethylurea, N-methyl pyrrolidone, hexamethylphosphoramide and N-alkyl lactams may also be employed. Various soluble inorganic salts such as lithium chloride and calcium chloride may be added to the solvents to modify their solvating properties.

The time required for the solution polymerization step will depend, of course, on the particular reactant monomers and solvents employed as well as on reaction temperature and pressure. Suitable reaction times may be easily determined by those of ordinary skill in the art.

The polyamide products obtained according to the present process are high quality products having an inherent viscosity of at least above about 0.7 and more preferably above 1.0. Inherent viscosities of as high as about 6.0 may be obtained. The polymer products are obtained in excellent yields as high as 100%.

The resulting wholly aromatic polyamide is particularly useful in the preparation of fibers, films and fibrils by wet or dry spinning or other similar extruding techniques. In the spinning or shaping of the polymer into a fiber, film or the like structure, it is preferable to have an inherent viscosity of at least above about 0.7 and more preferably above 1.0 since the higher inherent viscosities contribute to higher fibrous stength.

When the wholly aromatic polyamide produced according to the present process forms a high solids solution with the reaction solvent, it can be shaped directly from the solution polymerization mixture. In such cases, neutralization of by-product mineral acid with a suitable base prior to extrusion is desirable.

As used herein, inherent viscosities ($\eta$inh) are determined in accordance with the following equation: $\eta$inh = In$\eta$rel./C. The relative viscosity ($\eta$rel) is determined by the dividing of the flow time in a capillary viscometer of a dilute solution of the polymer by the flow time for the pure solvent. The concentration (C) is 0.4 grams of polymer per 100 cc of concentrated (97–99%) $H_2SO_4$ at 25° C.

For purposes of simplicity, the invention will be described hereinafter more particularly with respect to the most preferred reactants, i.e., terephthaloyl dichloride and paraphenylene diamine. However, this is not to be interpreted as limiting the invention, as it is recognized that variations therein as set forth herein can be used with correspondingly good results.

EXAMPLE 1

22.7 g. paraphenylenediamine and 42.6 g. terephthaloyl dichloride both having particle size of 24 mesh (Tyler series) were mixed by tumbling under a $N_2$ atmosphere at 20° C for about ½ hour to form a uniform solids mixture.

400 ml of a mixed solvent of 2 parts hexamethylphosphoramide and 1 part N-methylpyrrolidone were charged to a 1500 ml resin flask equipped with a spiral fluorocarbon coated stirrer, nitrogen purge, drying tube, and $CH_2Cl_2$/dry ice bath. Prior to the addition of the mixed solvent the flask was flamed to dry while employing the nitrogen purge.

The solids mixture was added rapidly to the rapidly stirred solvent which had been cooled to −10.0° C. 50 ml of chilled mixed solvent was added to wash particles of monomers adhering to the addition funnel into the reaction flask.

Immediately after adding the solids mixture to the solvent, small lumps were noted throughout the reaction mixture. After approximately 10 minutes, gelling began to occur and after approximately 40 minutes the cavitating stirrer was turned off and the $CH_2Cl_2$/dry ice bath was removed.

The reaction mass was then left to stand at ambient temperature for approximately 4 hours. It was then triturated in 2000 ml of deionized water in a blender, filtered, and left to stand in 2000 ml of deionized water for about four days. The reaction mass was then extracted three times with hot deionized water and once with acetone and dried in an oven at 50°–60° C. to recover the product. 49.5 g. of polyparaphenylene terephthalamide having an inherent viscosity of 2.71 was obtained.

EXAMPLE 2

The following example utilized smaller particle size and more rapid stirring. p-Phenylenediamine, 22.7 g., and terephthaloyl dichloride, 42.6 g. (24mesh) were mixed and ground together, under $N_2$, until a fine, uniform powder was obtained. Mixed solvent (450 ml of 2 parts hexamethyl phosphoramide and 1 part N-methylpyrrolidone) was chilled to 0° to 5° C and poured into a chilled, $N_2$ blanketed home blender jar. The solvent was stirred at high speed and the monomer mixture was added all at once. Stirring continued until the mass "gelled". After standing five hours at room temperature the mixture was triturated with water in a blender. The resulting polymer was extracted with hot deionized water three times. After drying, poly-p-phenylene terephthalamide with inherent viscosity of 3.46 was obtained.

Although the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A process for the preparation of a wholly aromatic polyamide from an aromatic diamine and an aromatic diacid halide comprising:

a. mixing solid particulate diamine and solid particulate aromatic diacid halide in the substantial absence of oxygen and in the absence of a solvent or diluent therefor to obtain a uniform stoichiometrically balanced solids mixture; and b. thereafter polymerizing the resulting uniform solids mixture in an amide solvent to obtain said wholly aromatic polyamide having an inherent viscosity of at least above about 0.7 to about 6.0, said inherent viscosity being measured on a solution of 0.4 grams of polyamide per 100 cc. of concentrated $H_2SO_4$ at 25° C.

2. The process of claim 1, wherein the aromatic diamine corresponds to the formula $H_2N-Ar-NH_2$, wherein Ar is a divalent aromatic radical which is meta or para oriented and which is selected from the group consisting of

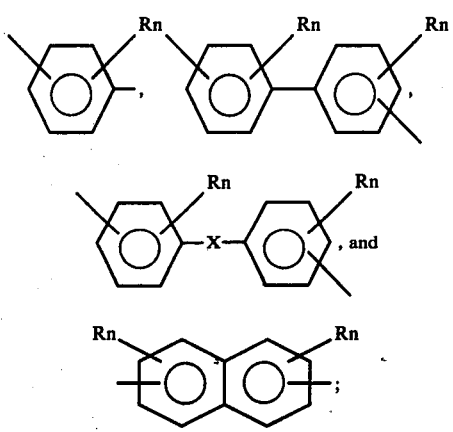

where R is alkyl or alkoxy of 1 to 6 carbons, chlorine, bromine or phenyl; n is an integer of 0 to 4; and X is $-O-$, $-S-$,

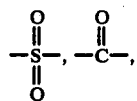

alkenylene of 2 to 6 carbons, cycloalkylidene of up to 8 carbons, azo, azoxy, or

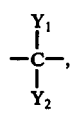

wherein $Y_1$ and $Y_2$ are independently hydrogen, alkyl of 1 to 6 carbons, phenyl or substituted phenyl.

3. The process of claim 2, wherein the aromatic diacid halide is of the formula:

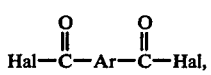

wherein Hal is chlorine or bromine and wherein Ar is as defined in claim 2.

4. The process of claim 3, wherein the amide solvent is selected from the group consisting of compounds of the formula

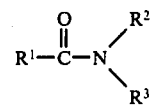

wherein $R^1$ is hydrogen or alkyl of 1 to 4 carbons and $R^2$ and $R^3$ are independently alkyl of 1 to 4 carbons; tetramethylurea; N-methylpyrrolidone and hexamethylphosphoramide.

5. The process of claim 4 wherein the polymerization step (b) is carried out in a batch process and wherein the uniform solids mixture of (a) is added to the amide solvent with agitation.

6. The process of claim 4 wherein the solution polymerization step (b) is carried out in a continuous process and wherein the uniform solids mixture of (a) is metered to a reaction zone simultaneously with the amide solvent.

7. The process of claim 5 wherein the polymerization step (b) is carried out for a time sufficient to form an aromatic polyamide product having an inherent viscosity of from about 1.0 to about 6.0.

8. The process of claim 5 wherein the wholly aromatic polyamide product is polyparaphenylene terephthalamide.

9. The process of claim 5 wherein the aromatic diamine and aromatic diacid halide have a particle size of less than about 24 mesh.

10. A process for the preparation of a wholly aromatic polyamide which comprises:

a. mixing, in about an equimolar ratio, a solid aromatic diamine of the formula $H_2N-Ar-NH_2$ and a solid aromatic diacid halide of the formula

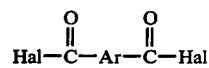

wherein Ar is a divalent aromatic radical which is meta or para oriented and which is selected from the group consisting of

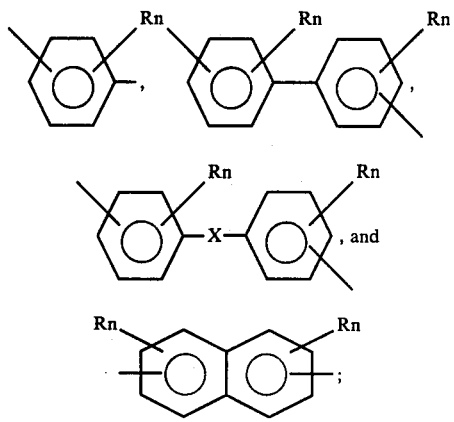

wherein R is alkyl or alkoxy of 1 to 6 carbons, chlorine, bromine or phenyl; n is an integer of 0 to 4; and X is $-O-$, $-S-$,

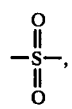

—C—, alkenylene of 2 to 6 carbons, cycyloalkylidene of up to 8 carbons, azo, azoxy, or

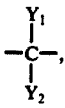

wherein $Y_1$ and $Y_2$ are independently hydrogen, alkyl of 1 to 6 carbons, phenyl or substituted phenyl; and Hal is chlorine or bromine, to obtain a uniform stoichiometrically balanced solids mixture, and b. thereafter polymerizing the resulting uniform solids mixture in an amine solvent selected from the group consisting of compounds of the formula

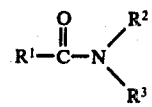

wherein $R^1$ is hydrogen or alkyl of 1 to 4 carbons and $R^2$ and $R^3$ are alkyl of 1 to 4 carbons; tetramethylurea; N-methyl pyrrolidone and hexamethylphosphoramide, for a time sufficient to obtain a wholly aromatic polyamide having an inherent viscosity of from about 1.0 to about 6.0, said inherent viscosity being measured on a solution of 0.4 grams of polyamide per 100 cc. of concentrated $H_2SO_4$ at 25° C.

11. The process of claim 10 wherein the aromatic diamine is paraphenylene diamine and the aromatic diacidhalide is terephthaloyl chloride.

* * * * *